United States Patent [19]

Ackley

[11] Patent Number: 5,423,022
[45] Date of Patent: Jun. 6, 1995

[54] METHOD FOR ADAPTING A RELATIONAL DATABASE MANAGEMENT SYSTEM SO THAT IT CAN ADDRESS FOREIGN INFORMATION

[75] Inventor: Paul D. Ackley, Lansdale, Pa.

[73] Assignee: General Signal Corporation, Stamford, Conn.

[21] Appl. No.: 255,122

[22] Filed: Oct. 3, 1988

[51] Int. Cl.⁶ .............................................. G06F 15/40
[52] U.S. Cl. ................................. 395/500; 395/600; 364/239.3; 364/260.81; 364/280.9; 364/282.1; 364/DIG. 1
[58] Field of Search ... 364/200 MS File, 900 MS File; 395/600

[56] References Cited

U.S. PATENT DOCUMENTS

| | | | |
|---|---|---|---|
| 4,205,371 | 5/1980 | Feather | 364/200 |
| 4,223,390 | 9/1980 | Bowers et al. | 364/900 |
| 4,482,980 | 11/1984 | Korwitz et al. | 364/900 |
| 4,631,664 | 12/1986 | Bachman | 364/200 |
| 4,635,189 | 1/1987 | Kendall | 364/200 |
| 4,714,995 | 12/1987 | Materna et al. | 364/200 |
| 4,787,063 | 11/1988 | Muguet | 364/900 |
| 4,805,134 | 2/1989 | Calo et al. | 364/900 |
| 4,831,582 | 5/1989 | Miller | 364/900 |
| 4,939,689 | 7/1990 | Davis et al. | 364/900 |
| 4,961,139 | 10/1990 | Hong et al. | 364/200 |
| 5,058,000 | 10/1991 | Cox et al. | 395/600 |

*Primary Examiner*—Parshotam S. Lall
*Assistant Examiner*—Ayni Mohamed
*Attorney, Agent, or Firm*—William G. Miller, Jr.; Raymond E. Smiley

[57] ABSTRACT

There is provided a method for adapting a commercially available relational database management system for a microcomputer so that it has the ability to access foreign data such as real time data for the examination and processing of that data by the DBMS. In this connection the operating system being used in the computer is provided with a kernel which has a driver which simulates for the DBMS a standard file format for the foreign data that is to be obtained. The information itself is obtained by a server activated by the driver. The server gets the foreign information and passes it back for the simulated file so that the simulated file can be addressed by the normal DBMS queries or commands.

2 Claims, 6 Drawing Sheets

METHOD FOR ADAPTING A RELATIONAL DATABASE MANAGEMENT SYSTEM SO THAT IT CAN ADDRESS FOREIGN INFORMATION

BACKGROUND OF THE INVENTION

This invention relates to a method for adapting a relational database management system (DBMS) in a digital computer so that the system will have the ability to utilize foreign information. More particularly, this invention relates to a method for adapting a DBMS so that it can utilize data which is foreign in its location, foreign in its file format, or foreign in its order. These forms of foreign data may, by way of example, include real time data, such as data concerning a process that is being monitored in real time; distributed data, such as data that is stored at different physical locations in a large industrial plant; distributed real time data, which presents both the problems of real time data as well as the problems of distributed data; data which is in a format which is foreign (different from) the format which is required for the operation of the DBMS; data which is in a format which is compatible but which is so ordered that it is not useful to the DBMS; and computed data, data which is not stored as files but is computed at the time it is needed to fulfill a query of a client, a user of the system.

For the purposes of this description a relational database management system (DBMS) is defined as a system for managing data in which data is organized in one or more rectangular tables of rows and columns, and wherein the contents of each column is data of the same type throughout all of the rows of the column. Thus, in a relational database the data organization fits set theory, and the records in different files can be linked (cross-referenced) by the content of columns that are common in the different files.

While there are many relational database management systems available, none of these systems is able to use foreign data without a conversion of the data into an appropriate format by entry of the data into a standard file of the database prior to the need to query the data. This placing of the data in the proper format becomes particularly difficult when it is necessary to utilize data which is being obtained in real time and which must be queried in real time. In such cases, it is important to have the ability to query such data without taking the time to first incorporate it into the database in the desired format. It is therefore an object of this invention to provide a method for adapting or constructing a relational DBMS to make it capable of incorporating foreign data so that the normal DBMS functions, such as reading and writing that data, may be accomplished.

More particularly, it is an object of this invention to provide a method for adapting or constructing a relational DBMS for incorporating real time data for use by the DBMS.

Since there are many good commercially available DBMSes, it is particularly useful to adapt an existing one for the incorporation of foreign data, in some circumstances one might incorporate the present invention in the construction of a relational DBMS from scratch. Therefore, since the same steps are required in either case, the words "adapting" and "constructing" are used interchangeably in this description, as they are applied to the invention.

SUMMARY OF THE INVENTION

To accomplish the objects of this invention there is provided a method and,means for adapting a relational database management system, for a computer so as to provide it with the ability to access foreign information for the examination and processing of that information by the DBMS. In this connection, the operating system being used in the computer is provided with a kernel which includes a driver which simulates for the DBMS a standard file format for the foreign information that is to be accessed. The information itself is obtained by a server activated by the driver. The server gets the foreign information and passes it back for the simulated file so that the simulated file can be addressed by the normal DBMS's queries.

DESCRIPTION OF THE PREFERRED EMBODIMENTS

Figure 1:
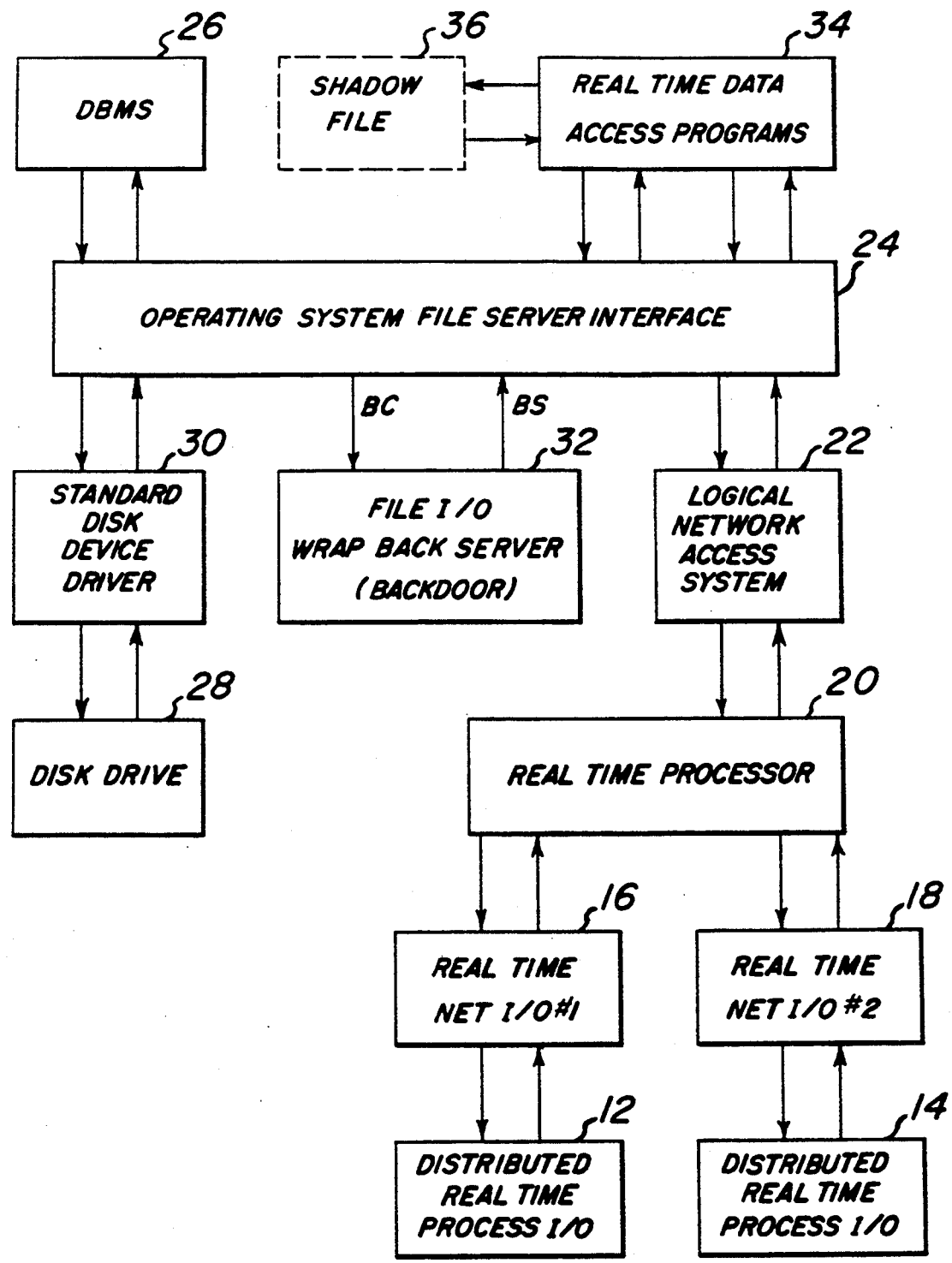
FIG. 1 is a block diagram showing the organization of the novel relational database management system of the present invention, as it is applied to the use of real time information by a standard DBMS where the index file for a relation is kept in a real DBMS file.

For the purpose of describing the invention, the drawing in conjunction with the present specification describes a system which makes real time distributed data accessed by input/output (I/O) devices or systems 12 and 14 available for collection and review by a commercially available relational DBMS running on a commercially available operating system without substantial modification being necessary to the DBMS. Additionally, it is desired that no impact to the structure or to the performance of the real time portion should result from this relational view. The data should also be editable through direct relational views using standard query language.

The real time I/O devices or systems 12 and 14 are connected to networks for accomplishing the input and output process, identified as Real Time Net I/O #1 and Real Time Net I/O #2 and identified by the reference characters 16 and 18, respectively. Those networks are operated by a Real Time Processor 20. The processor 20 of the present system is, in turn, under the control of the Logical Network Access System 22, which serves the function of requesting the real time data which the DBMS is addressing. The Logical Network Access System may, for example, be one of the well known interconnect systems such as Ethernet or SCSI. Alternatively, this real time system may be a system such as that shown in U.S. Pat. No. 4,482,980, which accesses a large amount of real time data that is distributed in a large number of widely scattered locations. More particularly, the apparatus of the figure could be the host computer 14 of the patent.

For the purposes of describing the present invention, U.S. Pat. No. 4,482,980 is hereby incorporated as part of this specification.

As shown, the Network Access System 22 is under the control of the Operating System File Server Interface 24, which, for example, may be the file server interface of a Unix operating system in a computer using an Intel 80386 processor.

As shown in the drawing, a commercial DBMS, such as Informix, which is available from Informix Software, Inc., is represented by the block 26 and may be utilized in the environment of the Unix operating system.

The operating system, as is the usual case, takes care of handling the data and also takes care of the control of the disc drives, such as drive 28, as by means of a driver 30 for the disc drives 28.

In order to use a commercially available relational DBMS such as Informix to process the real time data, it is necessary to add the software shown as the File I/O Wrapback Server 32, which for convenience will be known as the "Backdoor Driver", and the Real Time Data Access Programs 34, (The Backdoor Server) which in the scenario being illustrated, requires a Shadow file 36. The shadow file provides the relationship between tags which identify the data to the database and the information needed to get desired real time data from the real time system.

The File I/O Wrapback Server 32 (the Backdoor Driver) serves the function of making the real time information or data look like a normal file to the DBMS so that the user or client may use standard DBMS query language on the real time data.

The Real Time Data Access Programs 34 serve the purpose of obtaining the real time data from the real time system through the Logical Network Access System 22. Thus, these programs talk directly to the real time system and obtain the data requested by the backdoor so that the data can be put in standard DBMS form by the backdoor.

The scenario being illustrated by the drawing and by the program disclosed subsequently may be characterized as follows:

Direct With Real Index

In this scenario the index for a relation is kept in a real DBMS file. However, the data file is trapped by the file I/O wrapback server. In this case the data records have a regular file associated with them but the real time data server augments and changes the data as it is read and written. The file maintained by the real time data server must contain the key data and physical or simulated room for the elements of the tuple (relational database row or record) which are to be extracted or filled in. Then, when the data is accessed the real time server can by record number alone determine the augmentation or extraction which is to occur and route the request again to the real time system for execution. This scenario provides for the simplest real time data servers.

Figure 2:
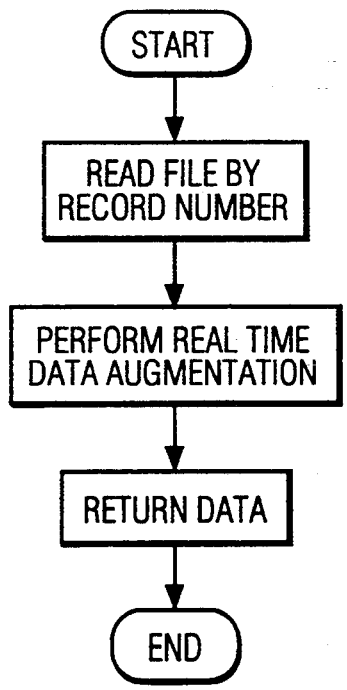
FIG. 2 is a diagram of the scenario illustrated by FIG. 1 and the program described below.

This scenario is shown in FIG. 2 which indicates that the first step is to read the file by record number, the second step is to perform real time data augmentation and the last step before the end is to return the data.

There are a number of other scenarios which can be used in accessing foreign data. Several of the possibilities are set forth below.

Direct with Virtual Index

In this scenario the file I/O wrapback server (backdoor) acts as an interceptor of the DBMS's operation and appears to the operating system as two devices on which there are multiple files. The first of these devices responds to all functions that a file normally would (READ, WRITE, SEEK). The second device relays these requests and their data to the real time data access programs. These real time data access programs simulate files of data and their indexes so that the DBMS can request data as if it were stored in an ISAM file structure. The real time data access programs can identify the record being requested because they presented the DBMS with the record number of the record to ask for in the simulated pages of the index. Then, when the data is actually accessed the real time data server makes a request of the real time system to collect or store the appropriate data. This scenario allows for access to more data than one has disk space to hold the indexes for.

Figure 3:
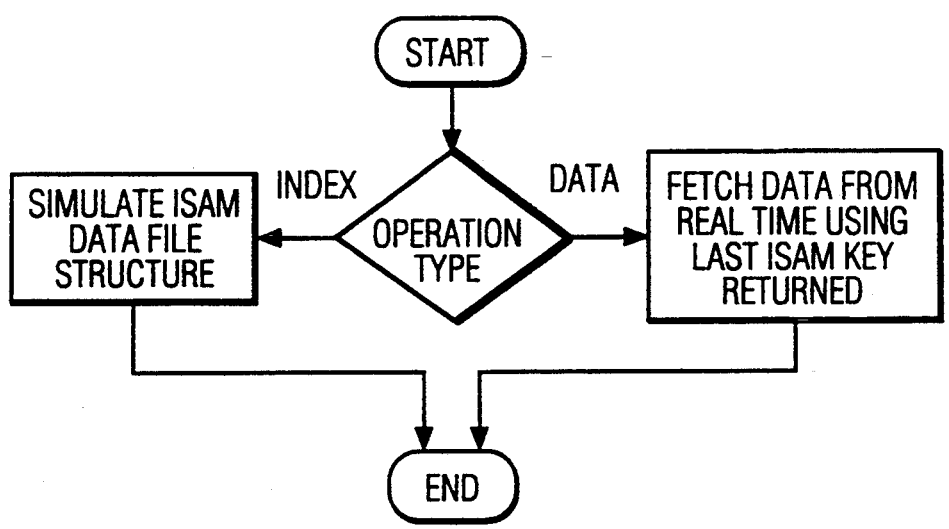
FIG. 3 is a diagram of the scenario described in the following description as "Direct with Virtual Index".

This scenario is shown in FIG. 3 in which the decision as to which operation type is to be carried out is the first step, followed by the fetch of data from real time using last ISAM key returned when the operation type is "data". When the operation type is "index" then the ISAM file structure is simulated.

Indirect with Simulated Index

In this scenario the amount of data to be collected and stored exceeds the DBMS's capacity to do so. However, in many instances it is possible to create non-relational storage which will have the capacity to hold the data as well as the performance to update it. Usually the data is of the form of barrels and is accessed as a matrix with one index being cyclic. By mapping the two dimensions of a barrel into simple row/column indexes through simple relations, the barrel becomes an index invariant structure. Usually only one row of mapping relation needs to be updated every time any values are changed in the actual data. Therefore, the DBMS can be presented a simulated index for the non-existent row and column fields of the tuples, and then the data when accessed can be augmented in the same way. This scenario allows large quantities of data to be stored quickly in a compressed format, without indexes. It will be fast and disk efficient. A variant of this scenario uses a real disk table where the location of the data is known, and it is written to directly by the real time access program without the file I/O wrap back server.

Figure 4:
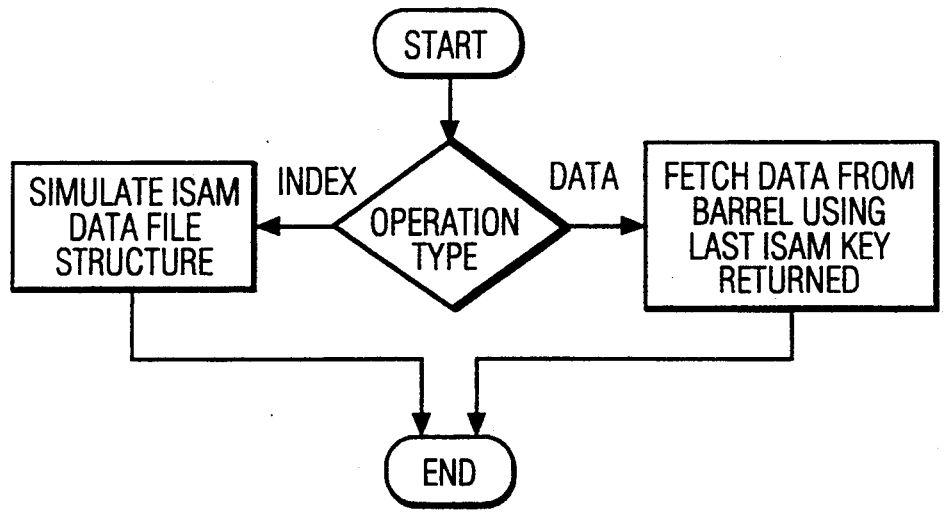
FIG. 4 is a diagram of part of the scenario described in the following description as "Indirect with Simulated Index".
Figure 5:
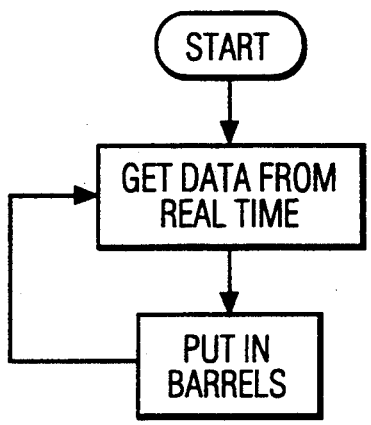
FIG. 5 is a diagram of another part of the scenario described by FIG. 4.

This scenario is shown in FIG. 4 and FIG. 5. FIG. 4 shows the first step as a decision as to the type of operation, "data" or "index". If it is "data" the data is fetched from the barrel using the last ISAM key returned, whereas if it is "index" the ISAM data file structure is simulated. FIG. 5 shows that the data is obtained from real time and put in barrels.

The programs which are reproduced below have been utilized in a microcomputer with an Intel 80386 processor, in conjunction with a Unix operating system, and an Informix database system to access real time data in environments such as that described in the patent referenced above. The programs associated with the Backdoor and the Real Time Data Access Programs are written in "C". These programs can, in general terms, can be described as accomplishing the following tasks:

1. bkdoor.h This is the "include" file for common data structures.
2. bkdoor.c This is the actual program that is linked to Unix libraries to form the new Unix kernel required.
3. bs/config Program for configuring Unix.
4. bc/config Program for configuring Unix.
5. BKSERVE.C This program is the Real Time Data Access Program and is exemplary of a program for getting the data from the real time system. It gets requests for data from the Backdoor, connects to the Logical Network Access System to get real time data, and passes the data to the "backdoor".

Four programs are presented which tell the DBMS what to do. These programs are written in 4GL (the fourth generation Informix command language) and, in the respective order in which they are listed below, accomplish the following tasks.

1. Makes table for shadow file.
2. Turns table into shadow file which makes backdoor connection.
3. Tells where real time data is and puts records in shadow file.
4. Causes DBMS to go out and get real time data and returns values requested The following programs, written in "C" are associated with the Backdoor and serve to make the real time information being accessed by the access program look like a standard format to the DBMS.

The following programs, written in "C", are associated with the
Backdoor and serve to make the real time information being accessed by
the access program look like a standard format to the DBMS.

```c
/*
 * File:   bkdoor.h        Database backdoor driver defs
 * ----------------------------------------------------------------
 */ define NO_SERVER      (0xff)

define BK_SERVER_MAP  (('B'<<8) | 1) /* ioctl command to map servers */
define BK_ERROR       (('B'<<8) | 2) /* return error to client         */ define CLIENT_BLOCK   STRUCT cb_
define SERVER_BLOCK   STRUCT sb_

CLIENT_BLOCK
{
    UBYTE  cb_server;       /* # of server handling this client */
    UBYTE  cb_flags;        /* flags                            */
};

#define CB_OPEN        (1<<0)      /* flag: 1 or more clients open */

SERVER_BLOCK
{
    UBYTE  sb_client;       /* # of client requesting service  */
    UBYTE  sb_flags;        /* flags: open...                  */
    UBYTE  sb_error;        /* error code                      */
    SHORT  sb_pid;          /* client pid                      */
    SHORT  sb_count;        /* data transfer byte count        */
    OFF_T  sb_offset;       /* user file offset for data transfer*/
};

#define SB_READ        (1<<0)      /* flag: read (else write)          */
#define SB_OPEN        (1<<1)      /* flag: server file has been opened */
```

```
#define SB_REQUEST     (1<<2)      /* flag: client request start   */
#define SB_EOF         (1<<3)      /* flag: end of file            */
#define SB_CLIENT_WAITING (1<<4)   /* flag: client waiting for server */
#define BK_DEBUG       0x100000
#define TR_BKDOOR      (BK_DEBUG + (1<<0))
```

```
/*
 * File: bkdoor.c       Database backdoor driver
 * ---------------------------------------------------------------
 *
 * Description:
 *
 * This driver provides the inter-process communication between user
 * programs accessing backdoor-type database files and the tasks that
 * support the backdoor functions.
 *
 * User programs using backdoor-type database files (clients) issue
 * open, close, read, and write calls as they would had the file been
 * a normal file system file.  However, by using the device special
 * files that are associated with this driver, read and write requests
 * are instead routed to a server task.
 *
 * This module contains both the client and server side of the driver
 * (client routines are prefixed by 'bc'; server routines by 'bs').
 */ include "local.h"

include "sys/param.h"
#include "sys/types.h"
#include "sys/sysmacros.h"
#include "sys/errno.h"
#include "sys/ioctl.h"
#include "sys/dir.h"
#include "sys/signal.h"
#include "sys/user.h"
#include "sys/immu.h"
#include "sys/region.h"
#include "sys/proc.h"
#include "kernext/semaphore.h"
#include "kernext/kerdebug.h"
#include "bkdoor/bkdoor.h"

/*
#define get_sem
#define rel_sem
*/

UINT        bk_init_flag = NO;

SEMAPHORE   *bk_buf_sem;
UBYTE       bk_buf[512];

extern CLIENT_BLOCK bk_clients[];
extern SERVER_BLOCK bk_servers[];
```

```
extern SEMAPHORE *server_sem[];
extern UINT     num_client_files;
extern UINT     num_server_files;

/*
 * Function:   bcopen, bcclose
 * ------------------------------
 *
 * Description:
 *
 * Open/close a client file.  The open flag is maintained to prevent
 * remapping a server/client relationship while a client is in use.
 */
bcopen(dev)
DEV_T           dev;
{
    UINT            client_num;
    CLIENT_BLOCK    *p_cb;

if(!bk_init_flag)
        bk_initialize();
    p_cb = &bk_clients[client_num = minor(dev)];
    if(client_num >= num_client_files)
    {
        u.u_error = ENXIO;
        return;
    }
    if(p_cb->cb_server == NO_SERVER)
    {
        u.u_error = EPIPE;
        return;
    }
    if(!(bk_servers[p_cb->cb_server].sb_flags & SB_OPEN))
    {
        u.u_error = EPIPE;
        return;
    }
    p_cb->cb_flags |= CB_OPEN;
    return;
}
bcclose(dev)
DEV_T           dev;
{ bk_clients[minor(dev)].cb_flags &= ~CB_OPEN;
    return;
}

/*
 * Function:   bcread
 * ------------------------
 *
 * Description:
```

```
 *
 * Handle a read from a client.  First a read command is sent to the server,
 * then this routine sleeps until the server wakes it, at which time it
 * copies the read data from the bk_buf (which was put there by the server).
 */
bcread(dev)
DEV_T          dev;
{
   SERVER_BLOCK    *p_sb;
   CLIENT_BLOCK    *p_cb;
   UINT            server_num;
   UINT            client_num;
   UINT            bc;
   UINT            level;

p_cb = &bk_clients[client_num = minor(dev)];
   server_num = p_cb->cb_server;
   if(server_num == NO_SERVER)
   {
      u.u_error = EPIPE;
      return;
   }
   p_sb = &bk_servers[server_num];

level = spl7();
   TR(TR_BKDOOR, ("bcread(): client = %x; server = %x\n", client_num,
       server_num));
   get_sem(&server_sem[server_num]);   /* secure exclusive access to server */
   get_sem(&bk_buf_sem);       /* likewise the buffer                */

TR(TR_BKDOOR, ("bcread(): got sems\n"));
/*
 * Set up the command block for the server.
 */
p_sb->sb_client = client_num;
p_sb->sb_flags |= (SB_READ | SB_REQUEST);
p_sb->sb_pid = u.u_procp->p_pid;
p_sb->sb_count = u.u_count;
p_sb->sb_offset = u.u_offset;
p_sb->sb_error = 0;

/*
 * Perform the transfer, looping under control of the server until all
 * bytes are transferred or until an error is encountered.
 */
while(u.u_count && !u.u_error)
{
   TR(TR_BKDOOR, ("bcread(): waking server; bc = %x\n", u.u_count));
   wakeup(&p_sb->sb_client);
   p_sb->sb_flags |= SB_CLIENT_WAITING;
   if(sleep(&p_sb->sb_error, PZERO + 5 | PCATCH))
   {
      u.u_error = EINTR;
      break;
```

```
        }
        if(u.u_error = p_sb->sb_error)
            break;
        if(bc = (u.u_count - p_sb->sb_count))  /* bc this iteration      */
        {
            if(copyout(bk_buf, u.u_base, bc))
            {
                u.u_error = EFAULT;
                break;
            }
            u.u_count -= bc;
            u.u_base += bc;
            u.u_offset += bc;
        }
        if(p_sb->sb_flags & SB_EOF)
            break;
    }

TR(TR_BKDOOR, ("bcread(): rel_sems...\n"));
    rel_sem(&bk_buf_sem);
    rel_sem(&server_sem[server_num]);
    TR(TR_BKDOOR, ("bcread(): return\n"));
    splx(level);
    return;
}

/*
 * Function:   bcwrite
 * ---------------------
 *
 * Description:
 *
 * Handle a write from a client.  First a write command is sent to the server,
 * then this routine sleeps until the server wakes it, at which time it
 * copies the write data to the bk_buf (from which the server takes it).
 */
bcwrite(dev)
DEV_T       dev;
{
    SERVER_BLOCK    *p_sb;
    CLIENT_BLOCK    *p_cb;
    UINT        server_num;
    UINT        client_num;
    UINT        bc;
    UINT        level;

p_cb = &bk_clients[client_num = minor(dev)];
    server_num = p_cb->cb_server;
    if(server_num == NO_SERVER)
    {
        u.u_error = EPIPE;
        return;
    }
    p_sb = &bk_servers[server_num];
```

```
level = spl7();
TR(TR_BKDOOR, ("bcwrite(): client = %x; server = %x\n", client_num,
    server_num));
get_sem(&server_sem[server_num]);   /* secure exclusive access to server */
get_sem(&bk_buf_sem);        /* likewise the buffer              */
TR(TR_BKDOOR, ("bcwrite(): got sems\n"));

/*
 * Set up the command block for the server.
 */
p_sb->sb_client = client_num;
p_sb->sb_flags |= SB_REQUEST;
p_sb->sb_flags &= ~SB_READ;                /* SB_WRITE pseudo flag    */
p_sb->sb_pid = u.u_procp->p_pid;
p_sb->sb_count = u.u_count;
p_sb->sb_offset = u.u_offset;
p_sb->sb_error = 0;

/*
 * Perform the transfer, looping under control of the server until all
 * bytes are transferred or until an error is encountered.
 */
while(u.u_count && !u.u_error)
{
   TR(TR_BKDOOR, ("bcwrite(): waking server; bc = %x\n", u.u_count));
   bc = min(u.u_count, sizeof(bk_buf));
   if(copyin(u.u_base, bk_buf, bc))
   {
      u.u_error = EFAULT;
      break;
   }
   wakeup(&p_sb->sb_client);
   p_sb->sb_flags |= SB_CLIENT_WAITING;
   if(sleep(&p_sb->sb_error, PZERO + 5 | PCATCH))
   {
      u.u_error = EINTR;
      break;
   }
   if(u.u_error = p_sb->sb_error)
      break;
   bc = u.u_count - p_sb->sb_count;        /* bc this iteration       */
   u.u_count -= bc;
   u.u_base += bc;
   u.u_offset += bc;
}

TR(TR_BKDOOR, ("bcwrite(): rel_sems...\n"));
rel_sem(&bk_buf_sem);
rel_sem(&server_sem[server_num]);
TR(TR_BKDOOR, ("bcwrite(): return\n"));
splx(level);
return;
}
```

```
/*
 * Function:    bsopen, bsclose
 * ------------------------------
 *
 * Description:
 *
 * Open/close a server file.  Make sure it is not opened more than once.
 */
bsopen(dev)
DEV_T           dev;
{
   INT          mdev;
   SERVER_BLOCK *p_sb;

if(!bk_init_flag)
      bk_initialize();
   if((mdev = minor(dev)) >= num_server_files)
   {
      u.u_error = ENXIO;
      return;
   }
   p_sb = &bk_servers[mdev];
   if(p_sb->sb_flags & SB_OPEN)
   {
      u.u_error = EBUSY;
      return;
   }
   p_sb->sb_flags |= SB_OPEN;
   return;
} bsclose(dev)
DEV_T           dev;
{ bk_servers[minor(dev)].sb_flags = 0;
   return;
}

/*
 * Function:    bsread
 * --------------------
 *
 * Description:
 *
 * Handle a command from a server.  Typically, the server reads the
 * command from the server block (generated by client read/write), then
 * comes back with a read or write to satisfy the client write or read request.
 *
 * This same routine is used whether the server is reading the command,
 * or reading to service a client write.  It determines which it is by
 * looking at the SB_REQUEST flag in the command, set once per operation
 * by the client prior to waking the server.
 */
```

```
bsread(dev)
DEV_T           dev;
{
    UINT            server_num;
    UINT            bc;
    UINT            level;
    SERVER_BLOCK    *p_sb;

level = spl7();
    server_num = minor(dev);
    p_sb = &bk_servers[server_num];
    TR(TR_BKDOOR, ("bsread: server = %x\n", server_num));
    while(!(p_sb->sb_flags & SB_CLIENT_WAITING))
        if(sleep(&p_sb->sb_client, PZERO + 5 | PCATCH))
        {
            u.u_error = EINTR;
            splx(level);
            return;
        } p_sb->sb_flags &= ~SB_EOF;
    if(p_sb->sb_flags & SB_REQUEST) /* "command" phase            */
    {
        TR(TR_BKDOOR, ("bsread: sending cmd, %x/%x\n", server_num,
            p_sb->sb_client));
        /*
         * Read the command from the server block.
         */
        p_sb->sb_flags &= ~SB_REQUEST;
        if(u.u_count != sizeof(SERVER_BLOCK))
        {
            u.u_error = p_sb->sb_error = EFAULT;
            p_sb->sb_flags &= ~SB_CLIENT_WAITING;
            wakeup(&p_sb->sb_error);
        }
        else
            if(copyout(p_sb, u.u_base, sizeof(SERVER_BLOCK)))
                u.u_error = p_sb->sb_error = EFAULT;
            else
            {
                u.u_base += sizeof(SERVER_BLOCK);
                u.u_offset += sizeof(SERVER_BLOCK);
                u.u_count -= sizeof(SERVER_BLOCK);
            }
    }
    else
    {
        if(p_sb->sb_flags & SB_READ)
            u.u_error = p_sb->sb_error = EIO;
        /*
         * Read a block of data.  The client has already allocated the buffer.
         */
        if(u.u_count != p_sb->sb_count)
            u.u_error = p_sb->sb_error = EFAULT;
```

```
        while(p_sb->sb_count && !u.u_error)
        {
            TR(TR_BKDOOR, ("bsread: reading client; count = %x\n", u.u_count));
            bc = min(p_sb->sb_count, sizeof(bk_buf));
            if(copyout(bk_buf, u.u_base, bc))
                u.u_error = p_sb->sb_error = EFAULT;
            else
            {
                u.u_base += bc;
                u.u_offset += bc;
                u.u_count -= bc;
                p_sb->sb_count -= bc;
                p_sb->sb_offset += bc;
            }
            p_sb->sb_flags &= ~SB_CLIENT_WAITING;
            wakeup(&p_sb->sb_error);
            if(u.u_count && !u.u_error)
                if(sleep(&p_sb->sb_client, PZERO + 5 | PCATCH))
                    u.u_error = EINTR;
        }
    }

TR(TR_BKDOOR, ("bsread(): return\n"));
    splx(level);
    return;
}

/*
 * Function:    bswrite
 * --------------------
 *
 * Description:
 *
 * Handle a write from a server in response to a client read.
 */
bswrite(dev)
DEV_T           dev;
{
    UINT        server_num;
    UINT        bc;
    UINT        level;
    SERVER_BLOCK    *p_sb;

level = spl7();
    server_num = minor(dev);
    p_sb = &bk_servers[server_num];

TR(TR_BKDOOR, ("bswrite(): server %x\n", server_num));
    /*
     * Write a block of data.  The client has already allocated the buffer.
     */
    p_sb->sb_flags &= ~SB_EOF;
    if(u.u_count > p_sb->sb_count)
        u.u_error = p_sb->sb_error = EFAULT;
```

```
      else
         if(!(p_sb->sb_flags & SB_READ))
            u.u_error = p_sb->sb_error = EIO;
      if(u.u_count < p_sb->sb_count)
         p_sb->sb_flags |= SB_EOF;
      if(!u.u_count)
      {
         p_sb->sb_flags &= ~SB_CLIENT_WAITING;
         wakeup(&p_sb->sb_error);
      }
      while(u.u_count && p_sb->sb_count && !u.u_error)
      {
         TR(TR_BKDOOR, ("bswrite(): writing client; count = %x\n", u.u_count));
         bc = min(p_sb->sb_count, sizeof(bk_buf));
         bc = min(bc, u.u_count);
      if(copyin(u.u_base, bk_buf, bc))
         u.u_error = p_sb->sb_error = EFAULT;
      else
      {
         u.u_base += bc;
         u.u_offset += bc;
         u.u_count -= bc;
         p_sb->sb_count -= bc;
         p_sb->sb_offset += bc;
      }
      p_sb->sb_flags &= ~SB_CLIENT_WAITING;
      wakeup(&p_sb->sb_error);
      if(u.u_count && !u.u_error)
         if(sleep(&p_sb->sb_client, PZERO + 5 | PCATCH))
            u.u_error = EINTR;
   }

TR(TR_BKDOOR, ("bswrite(): return\n"));
   splx(level);
   return;
}

/*
 * Function:   bsioctl
 * ----------------------
 */
bsioctl(dev, command, arg, flags)
DEV_T       dev;
UINT        command;
UINT        arg;
UINT        flags;
{
   UINT       level;
   UINT       server_num;
   UINT       i;
   UINT       j;
   UBYTE      clients[257];
   SERVER_BLOCK    *p_sb;
   CLIENT_BLOCK    *p_cb;
```

```
server_num = minor(dev);
p_sb = &bk_servers[server_num];
level = spl7();
switch(command)
{
    case BK_SERVER_MAP:
        if(copyin(arg, clients, 1))
            u.u_error = EFAULT;
        else
            if(copyin(arg + 1, clients + 1, clients[0]))
                u.u_error = EFAULT;
            else
            {
                /*
                 * Validate client file numbers
                 */
                for(i = 0; i < clients[0]; i++)
                {
                    j = clients[i + 1];
                    if(j >= num_client_files)
                    {
                        u.u_error = EINVAL;
                        goto end_bk_server_map;
                    }
                }
                /*
                 * Make sure there are no outstanding client requests for the
                 * affected client files.
                 */
                for(i = 0; i < num_client_files; i++) /* possible deletes    */
                {
                    p_cb = &bk_clients[i];
                    if(p_cb->cb_server == server_num)
                        if(p_cb->cb_flags & CB_OPEN)
                        {
                            u.u_error = EBUSY;
                            goto end_bk_server_map;
                        }
                }
                for(i = 0; i < clients[0]; i++) /* possible replacements
*/
                {
                    p_cb = &bk_clients[clients[i + 1]];
                    if(p_cb->cb_server && (p_cb->cb_server != server_num))
                        if(p_cb->cb_flags & CB_OPEN)
                        {
                            u.u_error = EBUSY;
                            goto end_bk_server_map;
                        }
                }
                /*
                 * Finally, delete current associations and plug in the
                 * server number for the affected clients.
                 */
```

```
                for(i = 0; i < num_client_files; i++)
                    if(bk_clients[i].cb_server == server_num)
                        bk_clients[i].cb_server = NO_SERVER;
                for(i = 0; i < clients[0]; i++)
                    bk_clients[clients[i + 1]].cb_server = server_num;
                dumpdump("ioctl", &clients[1], clients[0], NULL);
            }
end_bk_server_map:
            break;

case BK_ERROR:
            if(p_sb->sb_flags && SB_CLIENT_WAITING)
            {
                p_sb->sb_error = arg;
                wakeup(&p_sb->sb_error);
            }
            else
                u.u_error = EPIPE;
            break;

default:
            u.u_error = EINVAL;
            break;
    } splx(level);
    return;
}

/*
 * Function: bk_initialize
 * ------------------------
 *
 * Description:
 *
 * Set up tables for the backdoor driver.
 */
INT bk_initialize()
{
    UINT        i;

bzero(bk_clients, num_client_files * sizeof(CLIENT_BLOCK));
    bzero(bk_servers, num_server_files * sizeof(SERVER_BLOCK));
    for(i = 0; i < num_client_files; i++)
        bk_clients[i].cb_server = NO_SERVER;
    bk_init_flag = YES;
    return(0);
}

/*
 * File:   bkspace.c Backdoor driver
 * ---------------------------------------------
 */
```

```
#include "std.h"
#include "local.h"

#include "sys/types.h"

#include "kernext/kernext.h"
#include "kernext/semaphore.h"
#include "bkdoor/bkdoor.h"

#define MAX_CLIENT_FILES 25
#define MAX_SERVER_FILES 8

/* #include "config.h"        /* override above defaults          */

UINT num_client_files
            = MAX_CLIENT_FILES;
UINT num_server_files
            = MAX_SERVER_FILES;

CLIENT_BLOCK   bk_clients[MAX_CLIENT_FILES]; /* client control blocks    */
SERVER_BLOCK   bk_servers[MAX_SERVER_FILES]; /* server control blocks    */
SEMAPHORE *server_sem[MAX_SERVER_FILES];/* semaphores for server blocks*/
```

The following are programs for configuring the Unix Operating System.

```
* 1 "bs/config"
* config SCCSID(@(#)config     2.3    LCC)
*     "@(#)config    1.1"

character(26)

prefix = bs

* 18 "bs/config"

functions = open, close, read, write, ioctl

* 1 "bc/config"
* config SCCSID(@(#)config     2.3    LCC)
*     "@(#)config    1.1"

character(25)

prefix = bc

* 18 "bc/config"

functions = open, read, write, close

# This script is used to generate the backdoor device special files.

```

```
set -x
su root -c "mkdir /dev/bk"
cd /dev/bk
su root -c "rm /dev/bk/*"
su root -c "/etc/mknod bc00      c   25   0"
su root -c "/etc/mknod bc01      c   25   1"
su root -c "/etc/mknod bc02      c   25   2"
su root -c "/etc/mknod bc03      c   25   3"
su root -c "/etc/mknod bc04      c   25   4"
su root -c "/etc/mknod bc05      c   25   5"
su root -c "/etc/mknod bc06      c   25   6"
su root -c "/etc/mknod bc07      c   25   7"
su root -c "/etc/mknod bc08      c   25   8"
su root -c "/etc/mknod bc09      c   25   9"
su root -c "/etc/mknod bc10      c   25  10"
su root -c "/etc/mknod bc11      c   25  11"
su root -c "/etc/mknod bc12      c   25  12"
su root -c "/etc/mknod bc13      c   25  13"
su root -c "/etc/mknod bc14      c   25  14"
su root -c "/etc/mknod bc15      c   25  15"
su root -c "/etc/mknod bc16      c   25  16"
su root -c "/etc/mknod bc17      c   25  17"
su root -c "/etc/mknod bc18      c   25  18"
su root -c "/etc/mknod bc19      c   25  19"
su root -c "/etc/mknod bc20      c   25  20"
su root -c "/etc/mknod bc21      c   25  21"
su root -c "/etc/mknod bc22      c   25  22"
su root -c "/etc/mknod bc23      c   25  23"
su root -c "/etc/mknod bc24      c   25  24"
su root -c "/etc/mknod bc25      c   25  25"
su root -c "/etc/mknod bc26      c   25  26"
su root -c "/etc/mknod bc27      c   25  27"
su root -c "/etc/mknod bc28      c   25  28"
su root -c "/etc/mknod bc29      c   25  29"
su root -c "/etc/mknod bs00      c   26   0"
su root -c "/etc/mknod bs01      c   26   1"
su root -c "/etc/mknod bs02      c   26   2"
su root -c "/etc/mknod bs03      c   26   3"
su root -c "/etc/mknod bs04      c   26   4"
su root -c "/etc/mknod bs05      c   26   5"
su root -c "/etc/mknod bs06      c   26   6"
su root -c "/etc/mknod bs07      c   26   7"
su root -c "chmod 666 /dev/bk/*"
```

The following program is the Real Time Data Access Program.

```
/*******************************************************************
 *                                                                 *
 *                      BKSERVE.C                                  *
 *                                                                 *
 * This is a simple exemplary back door server for a relation which *
 * has two column point_name and value. The server will record all writes *
 * to the relation as setup information and all reads from the relation *
 * will cause the data to be filled in with the primary value of the *
 * point.                                                          *
 *                                                                 *
 *******************************************************************/
```

```c
#include "std.h"
#include "local.h"
#include "stdio.h"
#include "fcntl.h"
#include "errno.h"
#include "sys/types.h"
#include "bkdoor/bkdoor.h"
#include "scsi/scsiioctl.h"

define DO_DEBUG define RECORD_SIZE 1024 ifdef DO_DEBUG
define trace(a) printf a
#else
#define trace(a)
#endif

STATIC STRUCT i
{
   USHORT i_hlen;
   USHORT i_id;
   UBYTE  i_req_typ;
   UBYTE  i_ver_id;
   UBYTE  i_cont_id[4];
   UBYTE  i_data_list[24];
} immed =
{
   10, 0, 0, 0,                                          /* 10 byte header      */
   { 0, 0, 0, 0 },
   {
     2,                                                  /* type tag access     */
     '1', '2', '3', '4', '5', '6', '7', '8',
     '9', 'A', 'B', 'C',                                 /* Space for tag_name  */
     'P', 'V', ' ', ' ', ' ', ' ', ' ', ' ',             /* attribute name      */
     0, 0
   }
};

VOID main()
{
   INT           real_time;        /* file id for access to real time data */
   INT           f_shadow;         /* file id for relation shadow file     */
   INT           f_serve;          /* file id for server device file       */
   SERVER_BLOCK  sb;               /* server communication block           */
   CHAR          buf[RECORD_SIZE]; /* area to read and write records to    */
   STATIC CHAR   immed_buf[40];    /* area to get real time info into      */
   TANDEM        t;                /* structure to do real time data       */
   INT           i;
   UNION
   {
      CHAR   c[8];
      DOUBLE d;
```

```
    FLOAT   f;
} u;

t._t_w_count = sizeof(immed);    /* set up tandem structure for immed data */
t._t_w_buf   = (UBYTE *)&immed;
t._t_r_count = sizeof(immed_buf);
t._t_r_buf   = (UBYTE *)immed_buf;
/*
 * open needed device files
 */
if((real_time = open("/dev/scsi/rp02", O_RDWR)) < 0)
{
    printf("ERROR - Unable to open immediate data server pipe\n");
    exit();
} if((f_shadow = open("shadow", O_RDWR + O_CREAT, 0777)) < 0)
{
    printf("ERROR - Unable to open shadow file\n");
    exit();
} if((f_serve = open("/dev/bk/bs00", O_RDWR)) < 0)
{
    printf("ERROR - Unable to open server device file\n");
    exit();
}
/*
 * Tell device driver to map client device 0 to server 1
 */
if(ioctl(f_serve, BK_SERVER_MAP, "\001\000") < 0)
{
    printf("ERROR - Unable to map to client file 0\n");
    exit();
}

/*
 * Sit in loop and process all requests for data
 */
FOREVER
{
    if(i = read(f_serve, &sb, sizeof(sb)))
    {
        trace(("READ len=%d, op_len = %d\n", i, sb.sb_count));
        trace(("request read\n"));
        trace(("offset = %X, flags= %X\n", sb.sb_offset, sb.sb_flags));
        if(sb.sb_flags & SB_READ)
        {
            if(lseek(f_shadow, sb.sb_offset, 0) < 0)
            {
                ioctl(f_serve, BK_ERROR, ENXIO);   /* give user an error */
            }
            else
            {
```

```
        i = read(f_shadow, buf, sizeof(buf));
        if(i <= 0)
        {
            write(f_serve, buf, 0);            /* eof */
        }
        else
        {
            /*
             * Put point name to retrieve in real time request
             */
            immed.i_data_list[1]  = buf[0];
            immed.i_data_list[2]  = buf[1];
            immed.i_data_list[3]  = buf[2];
            immed.i_data_list[4]  = buf[3];
            immed.i_data_list[5]  = buf[4];
            immed.i_data_list[6]  = buf[5];
            immed.i_data_list[7]  = buf[6];
            immed.i_data_list[8]  = buf[7];
            immed.i_data_list[9]  = buf[8];
            immed.i_data_list[10] = buf[9];
            immed.i_data_list[11] = buf[10];
            immed.i_data_list[12] = buf[11];
            /*
             * get point from real time system
             */
            ioctl(real_time, SCIO_TANDEM_WR, &t);
            /*
             * fill read real time value into returned record
             */
            u.c[0] = immed_buf[5];
            u.c[1] = immed_buf[6];
            u.c[2] = immed_buf[7];
            u.c[3] = immed_buf[8];

u.d = u.f;
            trace(("Real time value = %f\n", u.d));

buf[12] = u.c[0];
            buf[13] = u.c[1];
            buf[14] = u.c[2];
            buf[15] = u.c[3];
            buf[16] = u.c[4];
            buf[17] = u.c[5];
            buf[18] = u.c[6];
            buf[19] = u.c[7];

trace(("results returned\n"));
            write(f_serve, buf, sizeof(buf));
        }
    }
}
else
{
```

```
            i = read(f_serve, buf, sizeof(buf));
            trace(("READ2 len = %d\n", i));
            if(i != sizeof(buf))
            {
               trace(("wrong length\n"));
               ioctl(f_serve, BK_ERROR, EIO);
            }
            else
            {
               if(lseek(f_shadow, sb.sb_offset, 0) < 0)
               {
                  trace(("bad seek on shadow\n"));
                  ioctl(f_serve, BK_ERROR, ENXIO);
               }
               else
               {
                  /*
                   * Pass write off to shadow file. The point name in this
                   * record will then be used during reads to determine
                   * what piece of real time data to access.
                   */
                  write(f_shadow, buf, sizeof(buf));
               }
            }
         }
      }
   }
   else
   {
      printf("ERROR - Unable to read server command block\n");
      exit();
   }
  }
}
```

The following are four programs associated with the DBMS in Informix' command language 4GL which tell the DBMS what to do.

main create database backdoor
    database "backdoor"
    create table bktrial(tag char(12),
                       val float,
                       pad1 char(1003))

end main cd     backdoor.dbs
cp     backdoor100.dat    shadow
mknod bktrial100.dat  c   25   0
chown ackley    bktrial100.dat
chgrp informix bktrial100.dat

```
database backdoor
main
    delete from bktrial insert into bktrial values("C60S1", -1., " ")
    insert into bktrial values("C60S2", -2., " ")
end main database backdoor
main
    define tag1 like bktrial.tag,
           val1 like bktrial.val select tag,val into tag1,val1 from bktrial
        where bktrial.tag = "C60S2"

display tag1 at 1,1
    display val1 at 1,40 select tag,val into tag1,val1 from bktrial
        where bktrial.tag = "C60S1"

display tag1 at 2,1
    display val1 at 2,40 end main
```

Figure 6:
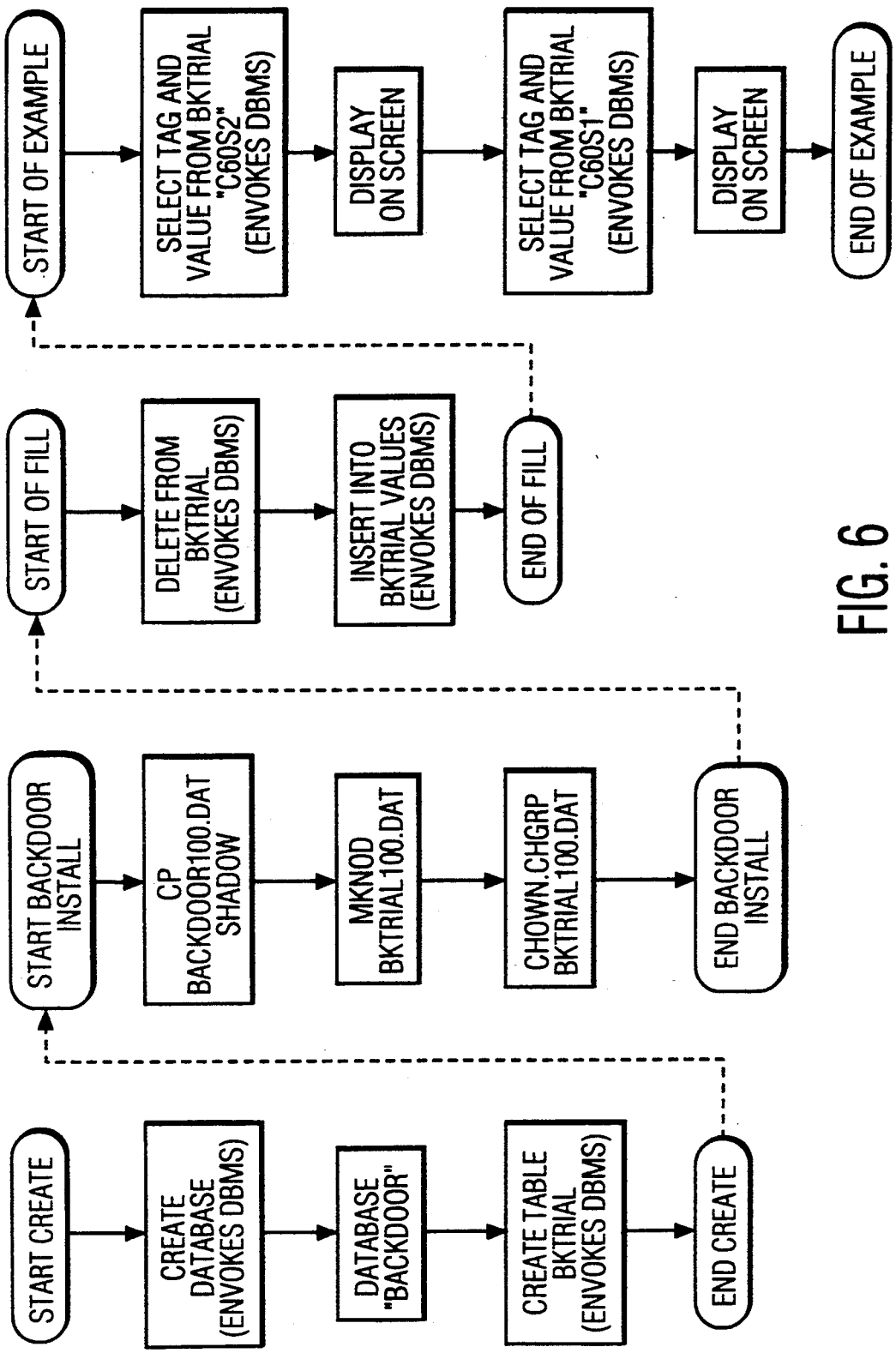
FIG. 6 is a diagram show which tells the DBMS what to do.

In FIG. 6 the four programs of the previous listing which tell the DBMS what to do are shown in flow diagram form so that the flow of those programs is evident.

Thus, on the left-hand side of FIG. 6 the first vertical path shows the creation of a table, BKTRIAL, for the shadow file. In the second vertical path from the left the program turns that table into a shadow file and makes the backdoor connection. In the next vertical path, third from the left, the program tells where real time data is (tagged as C60S1 and C60S2) and puts records in the shadow file. Then in the right-hand vertical path the DBMS goes out and gets real time data and returns the values requested for display.

Figure 7:
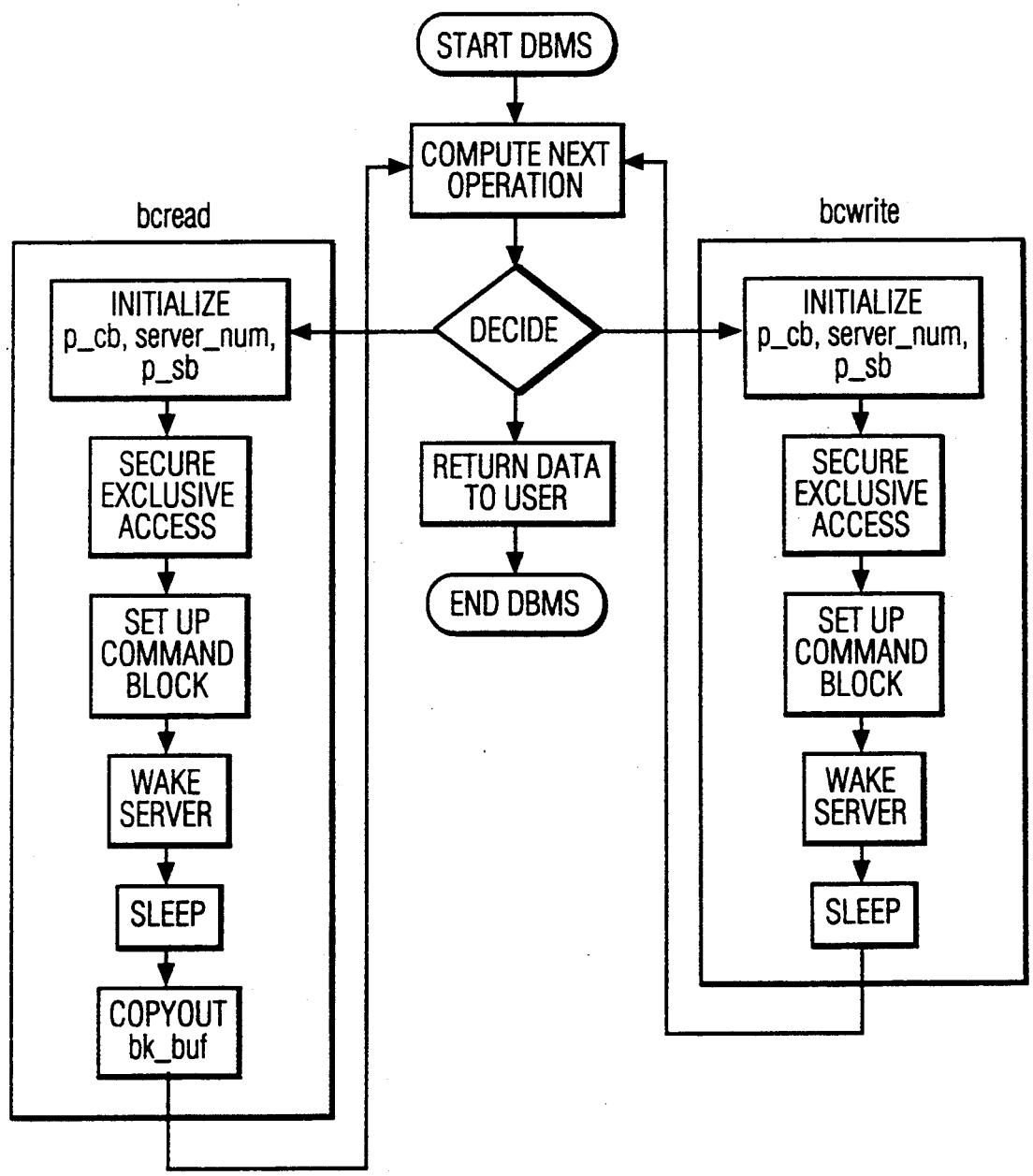
FIG. 7 is a diagram showing the flow through the driver from the DBMS corresponding to blocks 26 and the bc side of block 32.

In FIG. 7 the flow of the program listing for the backdoor driver is shown with the bcread shown in the left-hand vertical path and the bcwrite shown in the right-hand vertical path. The various blocks in this diagram will be recognized in reference to the preceding program listing. With the bcread, which handles a read from a client, a read command is sent to the server, then the bcread routine sleeps until the server wakes it, at which time it copies the read data from the bk_buf, put there by the server. In handling a write from the client the write command is sent to the server, then the routine sleeps until awakended by any "wakeup client" block in FIG. 8.

Figure 8:
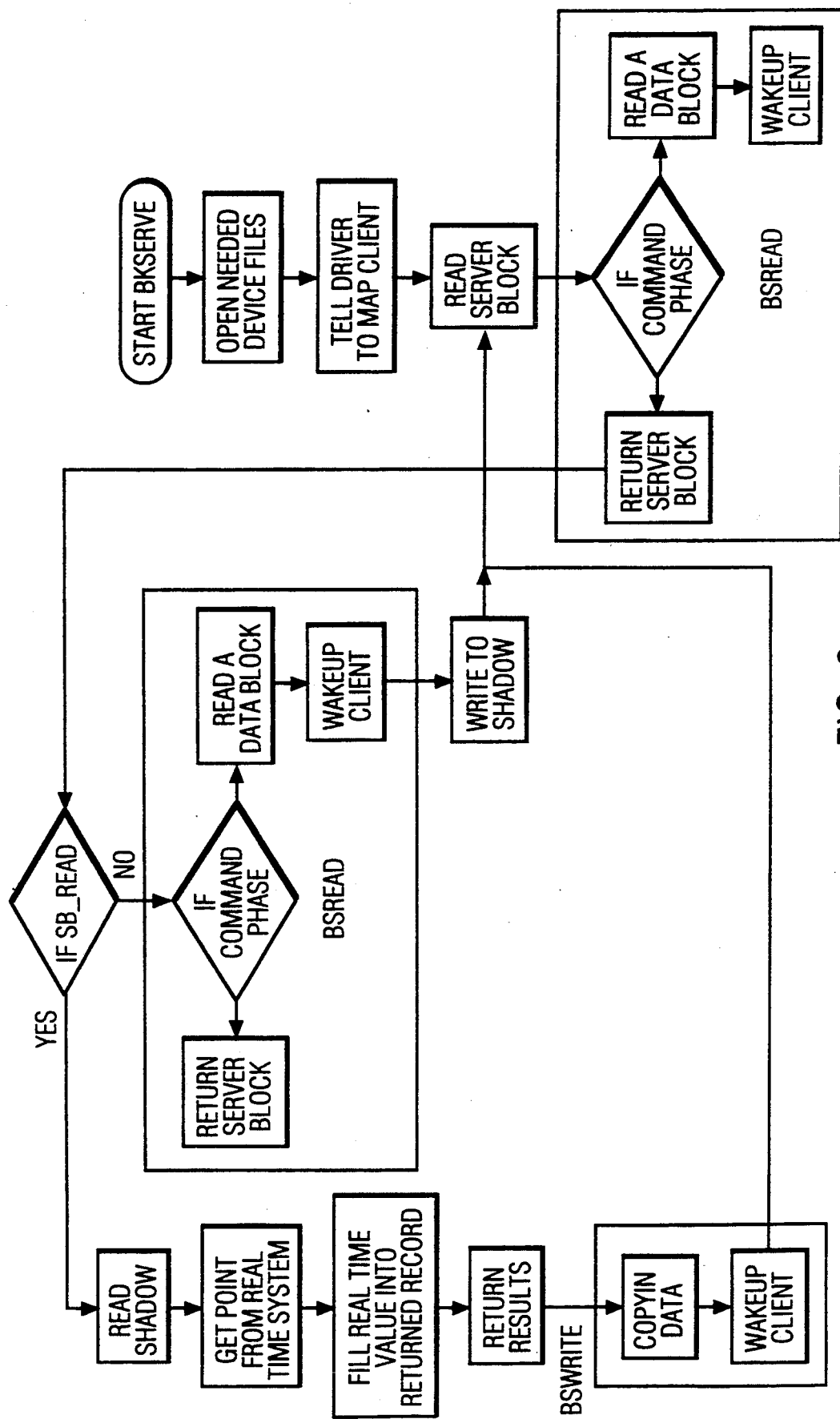
FIG. 8 is a diagram showing blocks 34 and the bs side of block 32 as well as block 36.

In FIG. 8 the flow of the program listing for the backdoor server is shown. This is the program listed as BKSERVE. The program starts in the right-hand vertical path by opening the needed device files after which the device driver is told to map the client. The requests for data are then processed by reading from the server block. The same routine is used whether the server is reading the command or is reading to service a client write. Thus, the BSREAD block in the lower right-hand corner is reading the command and it is the same as the BSREAD block in the middle of the drawing which is servicing a client write as determined by the decision block labeled "IF SB_READ" and the path labeled "NO". If a client read is indicated by the "YES" path from that decision block the vertical path on the left hand side of the drawing is followed. The program gets the point from the real time system and fills the read real time value into the returned record which is then processed by a BSWRITE in the block at the lower left hand corner of the Figure.

What is claimed is:

1. A method for adapting a relational database management system for a computer, where the system does not have the ability to handle foreign data or real time data and where the computer has a particular operating system which has a kern under which the database management system is to run with adaptation being directed to making it possible for said database management system to access foreign (backdoor) date for the examination and processing of that data by the database management system, comprising the steps of:
   providing the operating system kernel with a database backdoor driver operable to make foreign data look like a standard file to the database management system; and providing data access program whose scenario for obtaining the foreign data is an indirect scenario with a simulated index and said data access programs include provision for a shadow file which provides the relationship between tags which identify the data to the database and the information needed to get desired real time data from the real time system; and providing a data base backdoor server for getting the foreign data from the data access program for the backdoor files.

2. A method for adapting a relational database management system for a computer, where the system does not have the ability to handle foreign real time data data and where the computer has a particular operating system which has a kernel under which the database management system is to run, said adaptation being directed to making it possible for said database management system to access foreign data and form therefrom foreign data files for the examination and processing of that foreign data by the database management system, comprising the steps of:

providing a data access program for obtaining the foreign data from a real time system, said data access program being a direct scenario with a real index and including provision for a shadow file which provides the relationship between tags which identify the data to the database and the information needed to get desired real time data from the real time system; and providing a database backdoor server for getting the foreign data from the data access program for the foreign data files.

* * * * *